United States Patent [19]

Olofsson

[11] Patent Number: 4,631,216

[45] Date of Patent: Dec. 23, 1986

[54] LARGE-SURFACE AREA CONTROL PANEL

[76] Inventor: Stig Olofsson, Televerkets Industridivision, Box 1001, S-149 01 Nynsähamn, Sweden

[21] Appl. No.: 670,723

[22] Filed: Nov. 13, 1984

[30] Foreign Application Priority Data

Nov. 16, 1983 [SE] Sweden ............................... 8306315

[51] Int. Cl.[4] ............................ B32B 5/12; B32B 3/02; B32B 21/04

[52] U.S. Cl. .................................... 428/106; 428/157; 428/165; 428/172; 428/215; 428/537.1; 179/157

[58] Field of Search ..................... 428/537.1, 106, 157, 428/172, 165, 215

[56] References Cited

U.S. PATENT DOCUMENTS

| | | | |
|---|---|---|---|
| Re. 3,085 | 8/1868 | Mayo | 428/106 X |
| 842,411 | 1/1907 | Messinger | 428/106 |
| 3,661,688 | 5/1972 | Wheeler | 428/156 X |
| 3,697,363 | 10/1972 | Martinez | 428/187 X |
| 3,769,143 | 10/1973 | Kulesza | 156/154 |

*Primary Examiner*—Patricia C. Ives
*Attorney, Agent, or Firm*—Pollock, Vande Sande & Priddy

[57] ABSTRACT

A large-surface control panel (1) is made of wood. At least at parts of its extent in the plane of the panel the control panel exhibits a material thickness of 1.5–6.0 mm. At least said parts the control panel is constructed from three sheets of wood positioned immediately adjacent one to the other, with the adjacent sheets of wood being so arranged that the principal directions of the grain of the wood run cross-wise to each other.

4 Claims, 2 Drawing Figures

LARGE-SURFACE AREA CONTROL PANEL

TECHNICAL FIELD

The present invention relates to an arrangement for a large-surface control-panel which is made of wood, preferably solid wood such as mahogany, walnut, curly-grained birch, sycamore, cherry, jacaranda and/or rose-wood. The invention is intended to find an application primarily the telecommunications industry, for example in operator's consoles.

DESCRIPTION OF THE PRIOR ART

The manufacturing of control panels in wooden materials has already been disclosed. It is usual, however, to use other materials, principally plastic material to reduce thickness of the structure of the panel. It is important to ensure that the material thickness is not too great, since the control panel must be capable of providing room for the electronic telecommunications components which are positioned in the apparatus or arrangement concerned beneath the surface of the panel.

The control panel shall also be capable of permitting the arrangement of transcurrent holes for buttons, indicators, lamps and instruments, etc., and/or acoustic indicators or similar components.

DESCRIPTION OF THE PRESENT INVENTION

Technical Problem

In manufacturing the structure of the control panel of wood, problems will be encountered in respect of, amongst other things, its durability. When wooden materials are used, the material thickness, should essentially correspond to, or not exceed by too wide a margin, the equivalent thickness of the other types of material used in the panel. If transcurrent holes, for example for the buttons in keysets, are to be provided directly in the structual material of the panel itself, then particular problems of durability will arise at those points where cuts are made into the principal direction of the grain of the wood. In spite of this the need to be able to work the wooden material without restriction so as to permit the positioning of design stage.

Problems will also be encountered in avoiding the formation of wood and warping of the wooden material. The control panel must be capable of retaining its original condition for a lengthy period of service irrespective of the level of the stresses imposed by normal operation of the apparatus. Since the material involved here is wood, it may also be pointed out that normal operating conditions will impose high stresses from the point of view of moisture.

Solution

The present invention has as its principal object the solution of, among other things, the problems outlined above. One of the novel features of the arrangement is that, amongst other things the control panel at least at parts of its extent in tha plane of the panel consists of a small thickness material, preferable having a material thickness of 1.5–6.0 mm, and that the panel at least at these parts is constructed from three or more sheets of wood positioned immediately adjacent one to the other in face to face contact with each other. Further characteristics are that the adjacent sheets of wood are so arranged that the principal directions of the grain of the wood run cross-wise to each other.

In a further embodiment of invention it is proposed that, in the event of more than three sheets of wood being used, the number of sheets of wood shall be uneven. Furthermore said principal directions of the grain shall run cross-wise to each other preferably at right angels. In a preferred embodiment each sheet has a thickness of 0.5–2.0 mm.

Advantages

The present invention provides for a light flexible control panel structure which is also suitable from the point of view of its durability for use in applications where it is wished to provide a large number of transcurrent holes for buttons, control levers and lamps, etc. The wood used in the construction of the large-surface control panel can sustain a long lifetime without the risk of the cracking and warping which could impair the function of the panel and its appearance. The manufacture of the control panel is also comparatively simple.

DESCRIPTIONS OF THE DRAWINGS

A preferred embodiment of the control panel which exhibits the significant characteristic features of the invention is described below with simulanteous reference to the accompanying drawing, in which FIG. 1 shows a horizontal view of a telecommunications apparatus with a large-surface control panel in accordance with the invention; and FIG. 2 shows a section through the control panel.

DESCRIPTION OF THE PREFERRED EMBODIMENT

Figure 1:
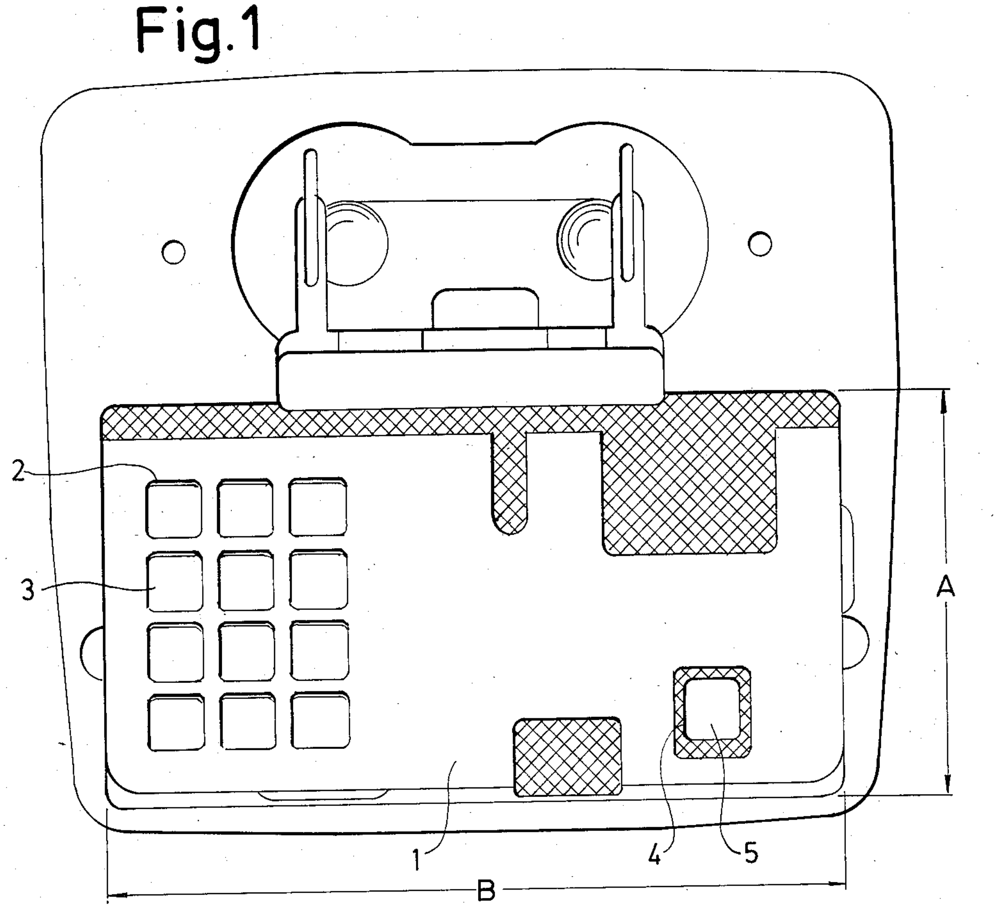

A telecommunications apparatus is shown viewed from above in FIG. 1, said apparatus exhibiting an inclined panel surface 1. The expression large-surface control panel is used in this context to denote, for example, a panel surface having dimensions of 200×300 mm (See the distances A and B in FIG. 1). The panel surface is assumed to have a number of holes 2 for a number of buttons 3, for example twelve push-buttons together making up a keyset. A hole 4 is also provided for a further button 5. The panel can additionally or alternatively incorporate further transcurrent holes for lamps and instruments, etc., which are not shown here. The form and the area of application of the panel may vary within wide limits, and the panel shown here shall be regarded only as an example.

The external design of the apparatus and its associated design features are not unique and will not, therefore, be described in detail here.

Figure 2:
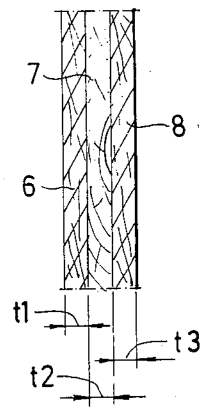

A major distinctive feature of the invention is illustrated in FIG. 2. The panel surface 1 (FIG. 1) is constructed from 3, 5, 7 or a similar uneven number of sheets of wood. The sheets of wood may be made in solid wood and consist of one of the types of wood referred to in the above. A major distinctive feature of the invention is that the sheet of wood are immediately adjacent one to the other and are glued together face-to-face by means of previously disclosed glueing process. A further distinctive feature is that the principal direction of the grain of the wood in a first sheet of wood, for example the sheet of wood 1 in FIG. 2, extends in a direction which runs cross-wise to the principal direction of the grain of the wood in an adjacent sheet 7. The principal direction of the grain of the wood in the sheet 8 which lies adjacent to the sheet 7 in turn runs cross-wise to the principal direction of the grain of the wood in the sheet 7. This principal directions in the sheets 6 and 8 will preferably run in parallel with each other. In the event of further sheets of wood being used, the principal directions in every other sheet will run in parallel with each other. The thickness of said sheets 6, 7 and 8 are indicated by t1, t2 and t3. Said thickness are selected between 0.5 and 2.0 mm. The thicknesses may be up to about 3.0 mm in exceptional cases. The total thickness of the material in the panel 1 is selected preferably between 1.5 and 6.0 mm.

The invention is not restricted to the embodiment illustrated in the above by way of example, but may undergo modifications within the context of the following Patent Claims and the idea of invention.

I claim:

1. A large-surface area control panel comprising a major portion made of a large piece of solid wood having a first thickness and a remaining portion of a second reduced thickness, said reduced thickness being in the range of from about 1.5 mm to about 6 mm, said control panel at least in said second thickness portion consisting of a plurality of sheets of wood positioned in face-to-face contact with each other, wherein the number of said sheets is uneven and wherein the directions of the grain of wood in two adjacent sheets run cross-wise to each other.

2. A control panel according to claim 1 wherein the number of said sheets is at least three.

3. A control panel according to claims 1 or 2 wherein said directions of the grain of wood in said sheets run cross-wise to each other at right angles.

4. A control panel according to claim 3 wherein the thickness of each sheet of wood is in a range of from about 0.5 mm to about 2 mm.

* * * * *